(12) United States Patent
Barnes et al.

(10) Patent No.: US 8,655,716 B1
(45) Date of Patent: Feb. 18, 2014

(54) INTEGRATED ADVERTISEMENT DELIVERY

(75) Inventors: James D. Barnes, Overland Park, KS (US); Sanjay Kumar Sharma, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 2119 days.

(21) Appl. No.: 11/627,951

(22) Filed: Jan. 27, 2007

(51) Int. Cl.
*G06Q 30/00* (2012.01)

(52) U.S. Cl.
USPC .......................................................... 705/14

(58) Field of Classification Search
USPC .......................................................... 705/14
See application file for complete search history.

(56) References Cited

U.S. PATENT DOCUMENTS

| 7,680,899 | B1 | 3/2010 | Barnes et al. | |
|---|---|---|---|---|
| 2004/0243623 | A1* | 12/2004 | Ozer et al. | 707/102 |
| 2007/0255616 | A1* | 11/2007 | Gjerstad et al. | 705/14 |
| 2008/0072139 | A1* | 3/2008 | Salinas et al. | 715/238 |

OTHER PUBLICATIONS

Patent Application entitled, "Dynamic Advertising Content Distribution and Placement Systems and Methods," by James D. Barnes, et al., filed Apr. 17, 2006 as U.S. Appl. No. 11/405,195.
Patent application entitled "Mobile-Device-Based Coupon Management Systems and Methods," filed Apr. 13, 2006, as U.S. Appl. No. 11/403,614.
Patent Application entitled, "Systems and Methods for State-Based Advertisement Messaging Across Media Types," by James D. Barnes, et al., filed May 22, 2006 as U.S. Appl. No. 11/438,540.
Patent Application entitled, "Inventory Management Integrating Subscriber and Targeting Data," by James D. Barnes, et al., filed Jun. 26, 2006 as U.S. Appl. No. 11/474,880.
Patent Application entitled, "Subscriber Data Insertion Into Advertisements Requests," by James D. Barnes, et al., filed Jul. 21, 2006 as U.S. Appl. No. 11/491,387.
Patent Application entitled, "In-Flight Campaign Optimization," by James D. Barnes, et al., filed Nov. 9, 2006 as U.S. Appl. No. 11/558,021.
Patent Application entitled, "Behavioral Analysis Engine for Profiling Wireless Subscribers," by James D. Barnes, et al., filed Nov. 8, 2006 as U.S. Appl. No. 11/557,939.
Patent Application entitled, "Carrier Data Bassed Product Inventory Management and Marketing," by James D. Barnes, et al., filed Dec. 28, 2006 as U.S. Appl. No. 11/617,703.
Patent Application entitled, "Advertisement Inventory Management," by James D. Barnes, et al., filed Oct. 27, 2008 as U.S. Appl. No. 12/259,187.

* cited by examiner

*Primary Examiner* — Alvin L Brown

(57) ABSTRACT

Disclosed herein is a system and method for creating and delivering integrated advertisements. An integrated advertisement may include a markup language portion for defining various formatting and properties of an advertisement and an image portion containing a plurality of images. Each of the images in the image portion may be designed to correspond with a particular screen size. The integrated advertisement provides scalability for delivering the advertisement to a number of different devices in accordance with multiple targeting criteria. The integrated advertisement also enables efficient management and reporting of advertising campaigns. An advertisement server selects and delivers an integrated advertisement and dynamically binds the markup language portion with one of the plurality of images based on the screen size of the device requesting the advertisement.

21 Claims, 6 Drawing Sheets

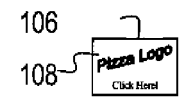
Fig. 1A  Fig. 1B  Fig. 1C
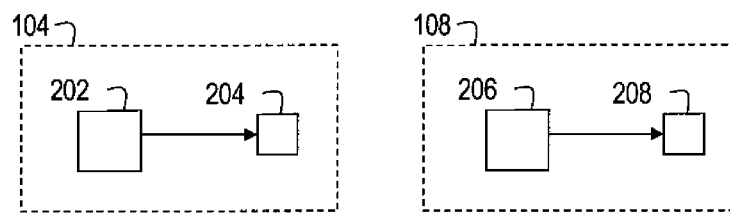
Fig. 2A
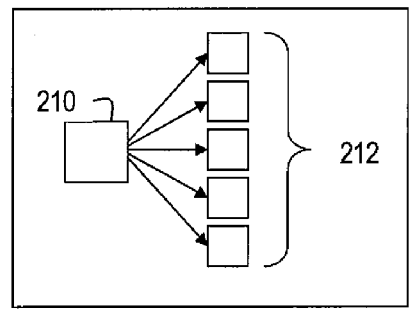
Fig. 2B

INTEGRATED ADVERTISEMENT DELIVERY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

With the continued development of wireless communication technologies, an increasing number of mobile devices are able to wirelessly access the Internet. One of the challenges associated with browsing the internet from mobile devices is the small screen size. Simply scaling existing web pages to fit the screen size of a mobile device may result in substantial distortion and/or a web page that is so small that it is difficult to see. Since advertisements displayed on a web page intended for large computer displays only take up a small portion of the total web page, the problems associated with scaling are further exacerbated for the advertisements destined for the small displays of mobile devices.

In desktop and laptop computers, a web browser may be displayed differently depending on the display size. For example, desktop and laptop computer displays may have diagonal measurements anywhere between 12 inches to 21 inches or more. While some distortion may occur between displaying a web page on a 21 inch monitor and scaling the web page to be displayed on a 12 inch monitor, the amount of distortion, if any, is negligible. Further, the distortion may be corrected for on a desktop or laptop computer by adjusting the display resolution.

The small size and the wide variety of screen sizes available on mobile devices presents a challenge for displaying web pages and any associated advertisements. For example, mobile devices such as cellular phones may have display screens anywhere in the range of 1"×1" to 1.5"×2", while personal digital assistant (PDA) devices may have display screens around 3"×2" and other mobile devices, such as Sony's PSP, may have screen sizes of 4"×3" or more. An advertisement may be designed for display on a mobile device with a larger screen size, such as a 4"×3" screen, but the advertisement may have substantial distortion if it is displayed on a mobile device with a smaller screen size, such as a 1.5"×2" screen.

SUMMARY

Disclosed herein is a system for delivering advertisements to a device. The system comprises the device which is configured to execute a web browser. Upon browsing to a website, the web browser is configured make a request for an advertisement to an advertisement server. The advertisement server is configured to select one of a plurality of advertisements in response to the request and further configured to select one of a plurality of images in the selected advertisement.

Also disclosed herein is a method for delivering advertisements. The method comprises receiving a request for an advertisement. Based on the request, one of a plurality of advertisements and one of a plurality of images in the selected advertisement are selected.

These and other features and advantages will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

FIGS. 1A-1C illustrate exemplary advertisements that may be displayed on two different mobile devices or two different size displays.

FIG. 2A illustrates the markup language portion and a single image in an image portion of two advertisements.

FIG. 2B illustrates an integrated advertisement including a markup language portion and a plurality of images in an image portion.

DETAILED DESCRIPTION

Figure 3:
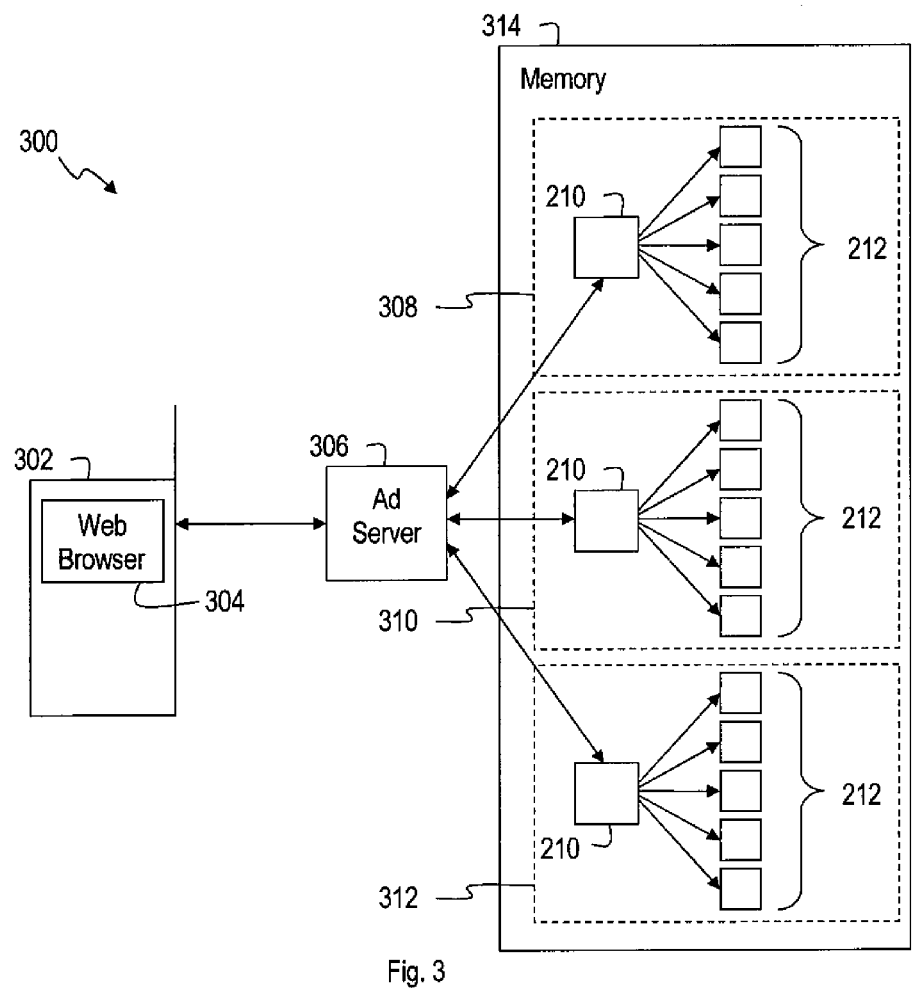
FIG. 3 illustrates one embodiment of a system for delivery of integrated advertisements.

It should be understood at the outset that although an illustrative implementation of one embodiment of the present disclosure is disclosed below, the present system may be implemented using any number of techniques, whether currently known or in existence. The present disclosure should in no way be limited to the illustrative implementations, drawings, and techniques illustrated below, including the exemplary design and implementation illustrated and described herein, but may be modified within the scope of the appended claims along with their full scope of equivalents.

Disclosed herein is a system and method for delivering an integrated advertisement to a mobile device. The integrated advertisement may include a markup language portion and an image portion. The markup language portion of the integrated advertisement defines text to be displayed in the advertisement and various formatting and properties of the advertisement. The image portion of the integrated advertisement contains a plurality of similar images. In order to ensure an advertisement is displayed with comparable quality on a variety of different screen sizes, each of the images in the image portion of the integrated advertisement may be designed to correspond with each of the different screen sizes.

The integrated advertisement may be delivered for display on a mobile device by an advertisement server. The advertisement server may dynamically bind the markup language portion of the integrated advertisement with one of the plurality of images in the image portion of the integrated advertisement based on the screen size of the mobile device requesting the advertisement.

Having an integrated advertisement with a plurality of images also enables scalability for delivering the advertisement to a number of different devices in accordance with targeting criteria. As mentioned above, each of the images in the integrated advertisement may correspond with a different screen size. In order to increase the number of screen sizes that are supported, a new image may be added to the integrated advertisement corresponding to each newly added screen size. Therefore, the number of devices that are able to view the integrated advertisement may be adjusted while still maintaining one targeted advertisement for each targeting criteria applied to the integrated advertisement.

An integrated advertisement also enables more efficient management and reporting of advertisement campaigns. With the integrated advertisement, an advertisement campaign may be assigned goals that are defined regardless of the size of the screen that may be used to view the advertisement. For example, a goal of an advertisement campaign may be defined as an advertisement being viewed a certain number of times regardless of the screen size that is used to view the advertisement, rather than having to separately define a goal of a number of advertisements to be viewed at each of a plurality of screen sizes. Similarly, reports on the status or success of an advertisement campaign may similarly aggregate data for an advertisement campaign regardless of the screen size of devices viewing the advertisement.

FIGS. 1A, 1B, and 1C illustrate exemplary advertisements that may be displayed on two different mobile devices. In FIG. 1A, a first device may have a screen size such that an area 102 is available for displaying an advertisement 104. The advertisement 104 is shown to include an image and text. The image in the advertisement 104 may include, for example, a graphical logo for a pizza restaurant as well as other graphics. The text in the advertisement 104 may contain a phrase designed to encourage a viewer of the advertisement 104 to perform some action, such as click on the advertisement 104. The text of the advertisement 104 shown in FIG. 1A includes the phrase, "Click Here For a Special Offer!" In FIG. 1B, a second device may have a screen size such that an area 106 is available for displaying the advertisement 104. In this case, the advertisement 104 has been scaled down for display in the area 106, resulting in substantial distortion to the advertisement 104. As can be seen in FIG. 1B, the image and the text of the advertisement 104 in area 106 is so small it is difficult to see all of the details.

The distortion shown in FIG. 1B resulting from scaling the image and text of the advertisement 104 into the area 106 is representative of the problem associated with displaying an advertisement on a wide variety of small screen sizes available on mobile devices. In particular, the quality of an advertisement may vary depending on the type of device that is displaying the advertisement. The problem of the wide variety of small screen sizes on mobile devices may be overcome by redesigning an advertisement for each of the screen sizes available on mobile devices. Looking to FIG. 1C, rather than scaling the advertisement to fit into the area 106, a new advertisement 108 containing a different image and text may be designed for the smaller size of the area 106. The image of the advertisement 108 simply displays a logo for the pizza restaurant rather than the entire image of the advertisement 104. Also, the text of the advertisement 108 is a shortened version of the text for the advertisement 104, simply using the phrase, "Click Here!" The redesigned advertisement 108 displayed in the area 106 has balanced the ease at which the advertisement 108 can be seen and the amount of information presented in the advertisement 108. It is contemplated that in some embodiments that the amount of information presented in a smaller area may be increased by utilizing scrolling text, displaying a series of images, or other effects known to those skilled in the art.

As shown in FIG. 2A, each of the advertisements 104 and 108 described above may include a markup language portion and an image portion. Specifically, the advertisement 104 includes a markup language portion 202 and an image portion 204. Similarly, the advertisement 108 includes a markup language portion 206 and an image portion 208. The markup language portions 202 and 206 may define the formatting, the content of any text, the use of an image, any functions associated with manipulating a portion of the advertisement, and other attributes that may be defined by a markup language known to one skilled in the art. The markup language portions 202 and 206 may be defined in HTML, XML, XHTML, or any other markup language format. In some embodiments, the markup language portions 202 and 206 may be defined using other text or programming languages known to those skilled in the art to define the various attributes of the advertisements 104 and 108. The markup language portions 202 and 206 may generally be referred to as a text portion of the advertisements 104 and 108.

The image portions 204 and 208 may simply be bitmap or otherwise formatted images whose use and placement are defined in the markup language portions 202 and 206 as described above. The advertisement 104 may be stored as a single file containing both the markup language portion 202 and the image portion 204. Similarly, the advertisement 108 may be stored as a single file containing both the markup language portion 206 and the image portion 208. Alternatively, the markup language portion 202 and the image portion 204 of the advertisement 104 may be stored as individual files. Similarly, the markup language portion 206 and the image portion 208 of advertisement 108 may be stored as individual files.

Another component of an advertisement is targeting criteria (not shown) for directing an advertisement to particular demographics or to be viewed at particular locations. For example, if the advertisement 104 is to be targeted using targeting criteria, then the association of the targeting criteria with the advertisement 104 results in a targeted advertisement. If the advertisement 108 is also to be targeted using the targeting criteria, then the association of the targeting criteria with the advertisement 108 results in another targeted advertisement. It can be seen that each advertisement corresponding to a different screen size may have to be individually targeted using the same targeting criteria. If the number of screen sizes supported increases, then the number of targeted advertisements for the targeting criteria similarly increases. For example, if a targeting criterion is to be applied to six advertisements, each corresponding to a different screen size, then six targeted advertisements are created.

The linear scaling of the number advertisements for each screen size is further exacerbated when multiple targeting criteria are used. For example, if three different targeting criteria are applied to the six advertisements described above, then six targeted advertisements are created for each of the three targeting criteria, resulting in eighteen targeted advertisements. It can be seen that with a separate advertisement for each supported screen size, the number of targeted advertisements increases multiplicatively corresponding to the number of targeting criteria and the number of supported screen sizes. The multiplicative increase in the number of targeted advertisements presents a problem of scalability which may lead to the number of supported screen sizes being limited or a number of targeting criteria being limited.

A further component of an advertisement is its relation to an advertising campaign. When creating an advertisement campaign, various goals may be defined. For example, a goal may be to have 3000 total hits for an advertising campaign.

When a separate advertisement is created for each of a plurality of screen sizes, then each advertisement may have the advertising campaign goals applied individually. For example, separate advertisements may be created for each of a small screen size, a medium screen size, and a large screen size. In order to satisfy the goal of 3000 total hits, then each of the three advertisements may be allocated 1000 hits.

Since each of the advertisements corresponding to a different screen size is separate, then the status of each advertisement is reported separately. For example, a report may be periodically generated that shows the status of the advertising campaign. Each of the three advertisements may separately report how many hits are remaining from the original 1000 hits allocated. For example, for the small screen size advertisement, there may be 250 additional hits remaining. For the medium screen size advertisement, there may be 500 additional hits remaining. For the large screen size advertisement, there may be 750 additional hits remaining. Each of these separate reports may then be separately examined and combined to determine that 1500 of the 3000 originally allocated hits are remaining in the advertising campaign.

In examining the reports from each of the advertisements, it can be seen that the small screen size advertisement will soon fulfill its 1000 hits quota. When that occurs, no additional small screen size advertisements will be delivered. This may result in lost advertising opportunities and lost revenue for the product or service being advertised. Also, it can be seen that the advertising campaign may be prolonged due to the apparent slow rate of hits for the large screen size advertisement. If it is desirable that the goal of 3000 hits be satisfied as soon as possible regardless of the screen size, then additional work must be done to reallocate the number of hits for each of the three advertisements. For example, the small screen size advertisement may be reallocated with a goal of 750 hits, the medium screen size advertisement may maintain its goal of 500 hits, and the large screen size advertisement may be reallocated with a goal of 250 hits.

In order to improve scalability of targeting and reporting, an integrated advertisement may be used as shown in FIG. 2B. The integrated advertisement of FIG. 2B includes a markup language portion 210. Similar to the markup language portions 202 and 206 described above, the markup language portion 210 may define the formatting, the content of any text, the use of an image, any functions associated with manipulating a portion of the advertisement, and other attributes that may be defined by a markup language known to one skilled in the art. The markup language portion 210 may take advantage of any duplicate portions of markup language portions that would be found in a plurality of individual advertisements. For example, the markup language portion 210 may include any duplicate portions of the markup language portions 202 and 206. The duplicate portions may include the color schemes, fonts, functions, etc., of the advertisements 104 and 108 which may be identically or similarly described in the markup language portions 202 and 206. The markup language portion 210 may describe the shared language portions once and describe any differences through conditional statements. For example, the pseudo-code example provided below demonstrates one type of conditional statement that may be used in the markup language portion 210 to describe screen size specific markup language attributes.

<start>
  . . .
  if screen size 1
    <text="Click Here For a Special Offer!">
  . . .
  if screen size 2
    <text="Click Here!">
  . . .
<end>

As shown in the example above, a series of "if" statements or other conditional statements may be made to determine which text string is to be displayed in an advertisement in accordance with the screen size of a device that the advertisement is to be displayed on. The pseudo-code example described above is merely for illustrative purposes and one skilled in the art would recognize that the pseudo-code may be adapted to correspond with any markup language syntax or modified to use other conditional statements or programming techniques to describe the screen size specific markup language attributes.

The integrated advertisement of FIG. 2B also includes an image portion 212 with a plurality of images. Each of the images in the image portion 212 of the integrated advertisement may be associated with one or more mobile devices, a particular screen size, or a range of screen sizes. For example, the image portion 212 may include the image portions of advertisements 104 and 108 in association with the first and second devices described above. Each of the images in the image portion 212 may have a different size and/or aspect ratio. Some of the images in the image portion 212 may be scaled, cropped, or otherwise edited versions of other images in the image portion 212. For example, the image in advertisement 108 is a cropped and scaled version of the image in advertisement 104. Some of the images in the image portion 212 may also be different than other images in the image portion 212. In this case the different images may relate to the advertisement, but are specially designed to correspond with a particular screen size. Each of the images in the image portion 212 may be stored as bitmap images or in any other image file format. In some embodiments, the images may be compressed, encrypted, or otherwise further processed. The markup language portion 210 and the image portion 212 of the integrated advertisement may be stored as a single integrated file. Alternatively, the markup language portion 210 and each of the images in the image portion 212 of the integrated advertisement may be stored in separate files.

With the integrated advertisement, the scalability problem caused by a multiplicative increase in the number of targeted advertisements may be eliminated. Similar to above, if an integrated advertisement is to be targeted using a targeting criterion, then the association of the targeting criteria with the integrated advertisement results in a targeted advertisements. It can be seen that with an integrated advertisement supporting a plurality of screen sizes, the number of targeted advertisements corresponds to the number of targeting criteria used. If the number of screen sizes supported increases, the number of targeted advertisements stays the same due to the integrated advertisement simply by making necessary changes to the logic of the markup language portion 210 and by adding another image to the image portion 212 for each new screen size supported. Therefore an integrated advertisement may be targeted in accordance with targeting criteria regardless of screen size, referred to herein as integrated targeting.

In addition to enabling scalability through integrated targeting, integrated advertisements also enable easier management and reporting of advertising campaigns. As described above, an advertising campaign may define a goal of 3000 total hits for the ad regardless of the screen size of the device that the advertisement is displayed on. When creating the advertising campaign, the goals of the advertising campaign may be applied to the integrated advertisement, herein referred to as integrated campaign creation. For example, using the goal defined above, all 3000 hits may be allocated to the integrated advertising campaign. When the advertisement is displayed on a device, the correct image is provided that corresponds to the screen size of the device. The number of hits remaining is then reduced by one, regardless of the screen size of the device where the advertisement was displayed. Instead of having to account for three advertisements, as described above, corresponding to three different screen sizes, the present solution allocates hits to the integrated advertisement regardless of the screen size where the ads are displayed.

Similar to integrated campaign creation, an integrated advertisement enables easier reporting of advertising campaigns. As described above with three advertisements corresponding to three screen sizes, each advertisement is separately reported and analyzed. With the integrated advertisement a single report may be generated aggregating the status of goals of an advertising campaign for a plurality of different screen sizes, referred to herein as integrated reporting. For example, a single report may be generated after a period of time that aggregates the number of hits for all of the screen sizes and may indicate that there remains 1500 out of 3000 hits allocated for the advertising campaign. The integrated report may be generated without requiring any additional work to analyze and aggregate the results from a plurality of different screen sizes.

FIG. 3 illustrates one embodiment of a system 300 for delivering integrated advertisements. The system 300 includes a mobile device 302, an advertisement server 306, and a memory or storage device 314 for storing one or more integrated advertisements. The mobile device 302 may execute a web browser 304 for browsing web pages on the internet (not shown) and for making requests for advertisements to the advertisement server 306. The mobile device 302 may, for example, connect to the internet through a gateway (not shown) using a wireline or wireless connection such as USB, Ethernet, Bluetooth, WiFi, CDMA, or GSM. The advertisement server 306 may reply to a request for an advertisement based on targeting criteria and the screen size of the mobile device making the advertisement request, as described in more detail below.

The advertisement server 306 may have access to a plurality of integrated advertisements 308, 310, and 312. As described in conjunction with FIG. 2B, each of the integrated advertisements 308, 310, and 312 includes at least a markup language portion 210 and an image portion 212. The memory 314, for storing the integrated advertisements 308, 310, and 312, may be resident on the advertisement server 306 or in one or more separate databases or other storage devices in communication with the advertisement server 306.

In one embodiment, an index (not shown) may be used by the advertisement server 306 to dynamically bind an image in the image portion 212 with the markup language portion 210 of an integrated advertisement based on a screen size of a device requesting the advertisement. The markup language portions 210 of a plurality of integrated advertisements 308, 310, and 312 may be individually stored in a first directory of the memory 314 or in another storage device. Each of the images in the image portion 212 of all of the integrated advertisements 308, 310, and 312 may also be individually stored in a second directory in the memory 314 or in another storage device. Each of the images in the second directory may be dynamically bound to one of the markup language portions 212 in the first directory at the time of the request for an advertisement. In some embodiments, the first directory and the second directory may be combined to store all of the images and the markup language portions 212 for all of the integrated advertisements 308, 310, and 312.

A plurality of indexes (not shown), one corresponding to each of the integrated advertisements 308, 310, and 312, may also be stored in the memory 314 or another storage device. Each index describes a relationship between the markup language portion 210 and each of the images in the image portion 212 of an integrated advertisement based on a screen size of a device requesting an advertisement. For example, for a first markup language portion 210, an index may associate a first image with a screen size of 1.5"×2", a second image with a screen size of 3"×2", and a third image with a screen size of 4"×3". The advertisement server 306 may use the index to determine which image to dynamically bind with a markup language portion 212 based on the screen size of the device requesting the advertisement. In some embodiments, the plurality of indexes may be combined into a single index.

In the embodiment shown in FIG. 3, each of the integrated advertisements 308, 310, and 312 have five images in the image portion 212. In other embodiments, each of the integrated advertisements 308, 310, and 312 may have more or fewer images in the image portion 212. Also, each of the integrated advertisements 308, 310, and 312 may have different numbers of images in the image portion 212. For example, the integrated advertisement 308 may have five images while the integrated advertisement 310 may have three images. Also, there may be more or less integrated advertisements.

Each of the integrated advertisements 308, 310, and 312 may be part of an advertising campaign that has a plurality of related advertisements that are targeted to different audiences. Each of the images in the image portion 212 of the integrated advertisements 308, 310, and 312 may be similar, but particularly designed to pique the interest of a specific audience. For example, the integrated advertisement 308 may have the images in the image portion 212 particularly designed for 18-25 year old males, the integrated advertisement 310 may have the images in the image portion 212 particularly designed for 45-60 year old females, and the integrated advertisement 312 may have the images in the image portion 212 particularly designed for business professionals.

While the images in the image portion 212 of each of the integrated advertisements 308, 310, and 312 are illustrated in FIG. 3 as mutually exclusive, one or more images may be shared between two or more integrated advertisements. For example, a small device with a particularly small screen size may not provide sufficient advertisement space to allow an advertisement to be tailored to a target audience. In this case, an image associated with the small device may be shared between two or more of the integrated advertisements 308, 310, and 312 in an advertising campaign.

Figure 4A:
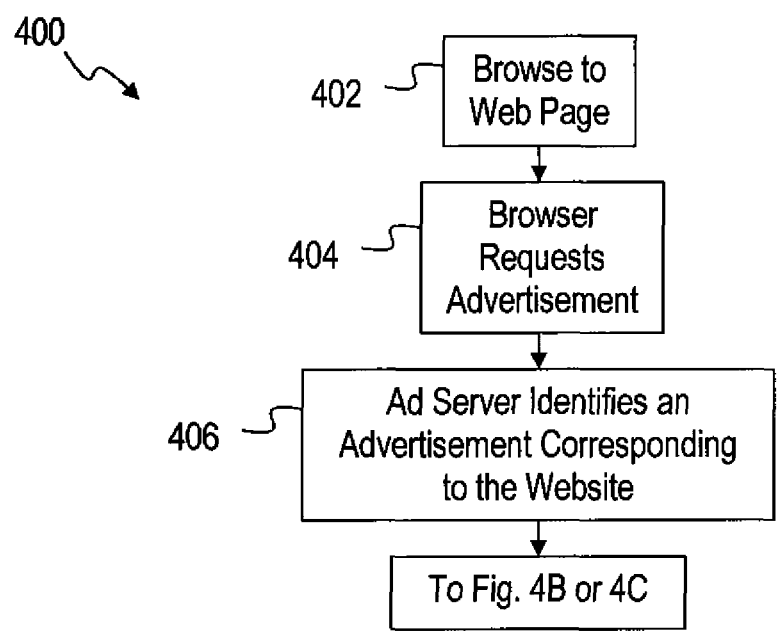
FIGS. 4A-4C illustrate methods for the interaction between a web browser on a mobile device and an advertisement server.
Figure 4B:
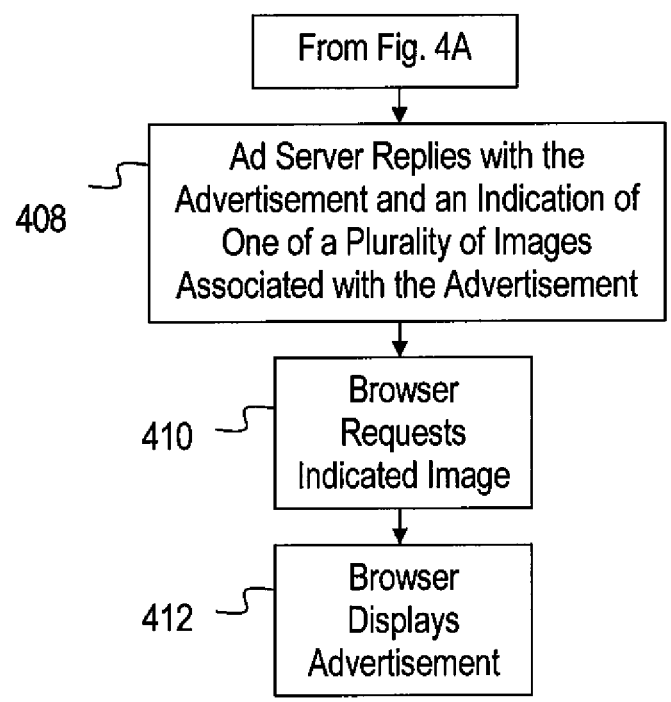
Figure 4C:
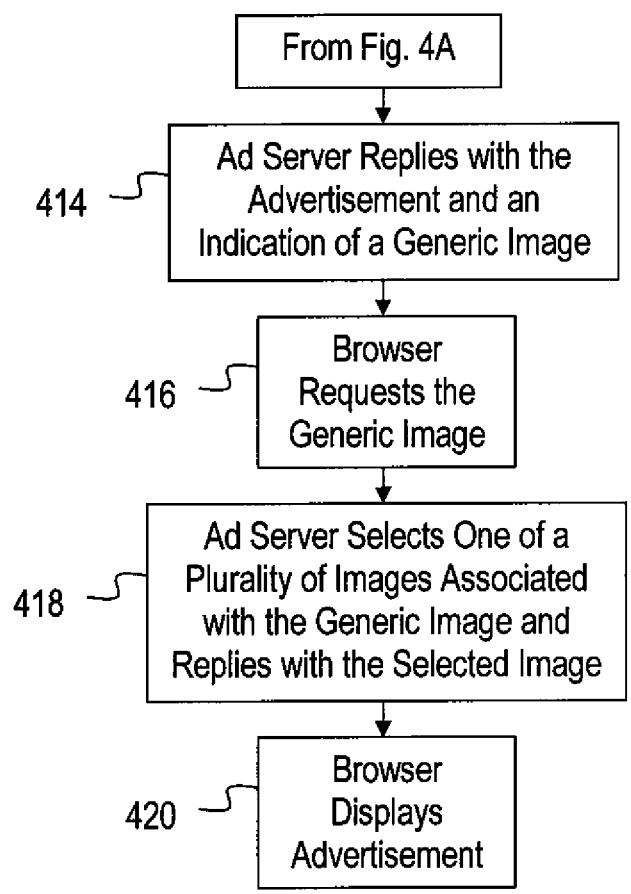

FIGS. 4A-4C illustrate methods for the interaction between the web browser 304 on the mobile device 302 and the advertisement server 306. FIG. 4A illustrates a method for the advertisement server 306 to receive a request for an advertisement from web browser 304. In block 402 the web browser 304 may browse to a website. In block 404, as part of the browsing function or in response to an indication in the website, the web browser 304 may send a request for an advertisement to the advertisement server 306. The request may include some or all of an indication of the website being browsed to, an indication of the type of device 302, demographic or user profile data stored on the device 302, or any other information that may be useful for selecting an appropriate integrated advertisement and an appropriate image within the integrated advertisement.

In block 406, the advertisement server 306 may select one of the integrated advertisements 308, 310, and 312 based on the website that was browsed to, the profile of the user of the mobile device 302, or any other targeting criteria. For example, the advertisement server 306 may select to respond to the web browser 304 with the integrated advertisement 308. After selecting an integrated advertisement to respond with, the advertisement server 306 also selects an image in the image portion 212 of the integrated advertisement to dynamically bind with the markup language portion 210 and sends the selected image and markup language portion 210 to the web browser 304 using one of the methods illustrated in FIG. 4B or 4C.

FIG. 4B illustrates one embodiment of a method for the advertisement server 306 to send the markup language portion 210 and an image in the image portion 212 of the selected integrated advertisement to the web browser 304. In block 408, the advertisement server 306 may select one of the plurality of images in an image portion 212 of an integrated advertisement. The advertisement server 306 may select the image based on the screen size of the mobile device. The advertisement server 306 may determine the screen size based on an indication of the screen size of the mobile device 302 provided in the request, or using other mobile device 302 information provided in the request.

In some embodiments, the information may include any or all of a device model, serial number, or other device identifier that can be used to determine or estimate the screen size of the mobile device 302. In other embodiments, the advertisement server 306 may send a request to the mobile device 302 for an indication of the screen size or other information that may be used to determine or estimate the screen size of the mobile device 302. In one embodiment, the advertisement server 306 may use another index, similar to that described above, to correlate the mobile device 302 information with a particular image in the image portion 212 of the selected integrated advertisement. In other embodiments, another index may be used by the advertisement server 306 to correlate the mobile device 302 information with a particular screen size. The advertisement server 306 may then use the index described above and the determined screen size to select the image.

Also in block 408, the advertisement server 306 may reply to the request for an advertisement from the web browser 304 with an indication of the selected image. In one embodiment, the indication of the selected image may be supplied to the web browser 304 by the advertisement server 306 inserting a unique file name of the selected image or a URL specifying the source of the selected image into the markup language portion 210. The advertisement server 306 may then reply to the request for an advertisement from the web browser 304 with the modified markup language portion 210. In another embodiment, the indication of the selected image may be supplied separately in the reply to the web browser 304 along with the markup language portion 210. In a further embodiment, the indication of the selected image may be the selected image itself. In this embodiment the advertisement server 306 may reply to the request for an advertisement from the web browser 304 with the markup language portion 210 and the selected image of the image portion 212 of the selected integrated advertisement.

In block 410, the web browser 304 may use the indication of the selected image to make a second request to the advertisement server 306 for the specific image. In block 412, upon receiving the selected image from the advertisement server 306, the browser 304 may display the advertisement for viewing on the mobile device 302.

FIG. 4C illustrates another embodiment of a method for the advertisement server 306 to send the markup language portion 210 and an image in the image portion 212 of the selected integrated advertisement to the web browser 304. In this embodiment, each of the images in the image portion 212 of an integrated advertisement may be assigned a unique file name with a common base name. For example, the unique file name for the images in the image portion 212 of advertisement 308 may be "advertisement308_1.bmp", "advertisement308_2.bmp", and so on. After selecting an integrated advertisement in block 406, the advertisement server 306 may reply to the request for an advertisement from the web browser 304 with the markup language portion 210 of the selected integrated advertisement in block 414. The markup language portion 210 of the selected integrated advertisement may include a generic file name of the image portion 212 or a URL directed to the image portion 212 of the selected integrated advertisement. Continuing the example used above, the generic file name may be "advertisement308.bmp" or the URL may be "http://adserver306.com/advertisement308".

In block 416, the web browser 304 may use the generic file name of the image portion 212 or the URL directed to the image portion 212 of the selected integrated advertisement to make a second request to the advertisement server 306 for an image. In block 418, the advertisement server 306 may select one of the plurality of images in an image portion 212 of the selected integrated advertisement similar to the selection process described above in conjunction with block 408 of FIG. 4B. The advertisement server 306 may then reply to the second request with the selected image. In block 420, upon receiving the selected image, the browser 304 may display the advertisement for viewing on the mobile device 302.

Figure 5:
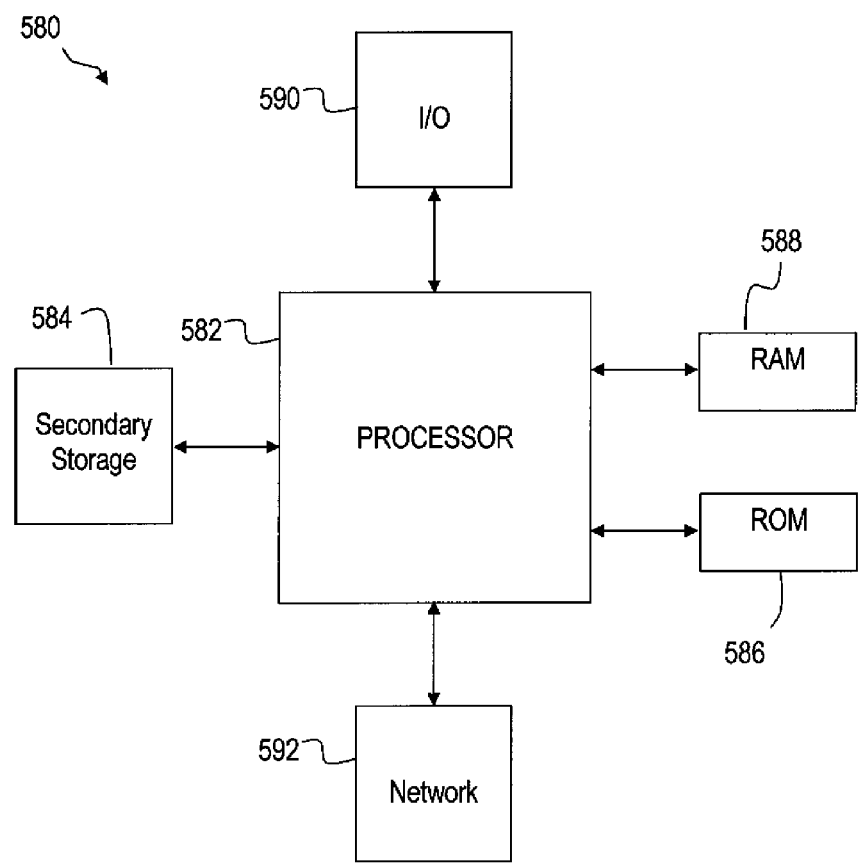
FIG. 5 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 5 illustrates a typical, general-purpose computer system suitable for implementing one or more embodiments disclosed herein. The computer system 580 includes a processor 582 (which may be referred to as a central processor unit or CPU) that is in communication with memory devices including secondary storage 584, read only memory (ROM) 586, random access βmemory (RAM) 588, input/output (I/O) 590 devices, and network connectivity devices 592. The processor may be implemented as one or more CPU chips.

The secondary storage 584 is typically comprised of one or more disk drives or tape drives and is used for non-volatile storage of data and as an over-flow data storage device if RAM 588 is not large enough to hold all working data. Secondary storage 584 may be used to store programs which are loaded into RAM 588 when such programs are selected for execution. The ROM 586 is used to store instructions and perhaps data which are read during program execution. ROM 586 is a non-volatile memory device which typically has a small memory capacity relative to the larger memory capacity of secondary storage. The RAM 588 is used to store volatile data and perhaps to store instructions. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, it is contemplated that the processor 582 might receive information from the network, or might output information to the network in the course of performing the above-described method steps. Such information, which is often represented as a sequence of instructions to be executed using processor 582, may be received from and outputted to the network, for example, in the form of a computer data signal embodied in a carrier wave.

Such information, which may include data or instructions to be executed using processor 582 for example, may be received from and outputted to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions, codes, computer programs, scripts which it accesses from hard disk, floppy disk, optical disk (these various disk based systems may all be considered secondary storage 584), ROM 586, RAM 588, or the network connectivity devices 592.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. An advertisement system, comprising:
    an advertisement server configured to promote providing advertisements for display on mobile devices, each advertisement including:
        a text portion such that the text portion is displayed having a first attribute when the mobile device has a first screen size, and wherein the text portion is displayed having a second attribute when the mobile device has a second screen size, and
        a plurality of images corresponding to a plurality of different mobile device screen sizes, at least a first image of the plurality of images displayed when the mobile device has the first screen size and at least a second image of the plurality of images displayed when the mobile device has the second screen size.

2. The advertisement system of claim 1, wherein the plurality of images are substantially similar.

3. The advertisement system of claim 1, wherein the text portion is a markup language.

4. The advertisement system of claim 1, wherein the advertisement server dynamically binds the text portion with at least one of the plurality of images when providing each advertisement.

5. The advertisement system of claim 1, wherein the advertisement server selects an advertisement in accordance with a request for an advertisement and provides the text portion and an indication of one of the plurality of images corresponding to the selected advertisement.

6. The advertisement system of claim 5, wherein the indication is any of a file name of the one of the plurality of images, a generic name assigned to all of the plurality of images, or the one of the plurality of images.

7. The advertisement system of claim 1, where the first image is displayed on the first screen size at a comparable quality to the second image displayed on the second screen size.

8. A method for delivering an advertisement from an advertisement server to a mobile device, comprising:
    selecting, by the advertisement server, an advertisement for display on a mobile device with a screen size in accordance with targeting criteria, the advertisement comprising a text portion and a plurality of images, each of the plurality of images corresponding to at least one of a plurality of different screen sizes; and
    communicating, by the advertisement server, the text portion and one of the plurality of images corresponding to the screen size from the advertisement server to the mobile device.

9. The method of claim 8, wherein the targeting criteria is associated with the advertisement such that the advertisement is targeted irrespective of a screen size of the mobile device.

10. The method of claim 8, further comprising:
    displaying the one of the plurality of images in accordance with the text portion.

11. The method of claim 8, further comprising:
    targeting the advertisement for display on a second mobile device with a second screen size in accordance with the targeting criteria; and
    communicating the text portion and one of the plurality of images corresponding to the second screen size to the second mobile device.

12. The method of claim 8, further comprising:
    modifying the advertisement to include an additional image corresponding to an additional screen size;
    targeting the advertisement for display on a second mobile device with a screen size equal to the additional screen size in accordance with the targeting criteria; and
    communicating the text portion and the additional image to the second mobile device.

13. The method of claim 8, wherein the advertisement is targeted in accordance with a request for an advertisement from the mobile device.

14. A method for delivering an advertisement from an advertisement server to a mobile device in order to achieve a goal, the method comprising:
   assigning, by the advertisement server, a goal to an advertisement, the advertisement comprising a text portion and a plurality of images, each of the images corresponding to at least one screen size;
   delivering, by the advertisement server, the advertisement to at least one device with a first screen size, wherein the advertisement is delivered by communicating the text portion and one of the plurality of images corresponding to the first screen size; and
   updating, by the advertisement server, a status of the goal in accordance with the delivery of the advertisement to the at least one device with the first screen size.

15. The method of claim 14, wherein the status is updated irrespective of which of the plurality of images is delivered.

16. The method of claim 14, further comprising:
   reporting the status as an aggregated status of the goal of the advertisement.

17. The method of claim 14, further comprising:
   delivering the advertisement to at least one device with a second screen size, wherein the advertisement is delivered by communicating the text portion and one of the plurality of images corresponding to the second screen size; and
   updating the status of the goal in accordance with the delivery of the advertisement to the at least one device with the second screen size.

18. The method of claim 14, wherein the goal is a number of times the advertisement is delivered.

19. The method of claim 14, wherein the advertisement is delivered in accordance with a request for an advertisement from the at least one device.

20. The method of claim 14, further comprising:
   displaying the one of the plurality of images on the first screen in accordance with the text portion.

21. The method of claim 1, wherein the advertisement server selects the first image of the plurality of images when the mobile device has the first screen size, and wherein the advertisement server selects the second image of the plurality of images when the mobile device has the second screen size.

* * * * *